3,219,517
POLYKETENE-MONOKETENE CONDENSATION COPOLYMER REACTION PRODUCTS AND FIBER TREATMENT
Joseph Paul Bain, Jacksonville, Fla., assignor to The Glidden Company, Cleveland, Ohio, a corporation of Ohio
No Drawing. Filed July 24, 1963, Ser. No. 297,224
8 Claims. (Cl. 162—164)

This invention relates to condensation copolymer reaction products of ketenes, fiber-treating compositions of same, and treatment of fibers therewith.

Higher molecular ketenes of monobasic or polybasic carboxylic acids containing a substituent hydrocarbon radical of at least 4 carbon atoms heretofore have been proposed for water repellent treatment of textile fibers, e.g., U.S. Patent 2,411,860, and ketene dimers of the formula [RCH=C=O]$_2$, where R is a hydrocarbon radical of aryl, aralkyl, alkyl, cycloalkyl and alkaryl groups, have been proposed for use in sizing paper to impart, for example, alkali and water resistance thereto, e.g., U.S. Patents 2,856,310; 2,627,477; 2,986,488; 2,961,366; and 2,961,367.

I have now found a new class of ketene condensation products that impart good alkali and water resistance to fibers coated therewith, and superior aqueous acid resistance.

As a first aspect, my invention comprises a condensation copolymer reaction product of a polyketene of a polyenoic carboxylic polymer acid and a higher molecular monoketene containing a hydrocarbon radical of at least four carbon atoms, said radical preferably being aliphatic for economy. Such polyenoic carboxylic polymer acid is selected from the group consisting of dimers of polyenoicmonocarboxylic acids, trimers of polyenoicmonocarboxylic acids and mixtures of same, and the polyketenes from such acids will be referred to herein as ketenes of polymer acids for convenience. Advantageously, the product resulting from reacting about 0.1-9 weight parts of the polyketene per weight part of the higher molecular mononetene gives the major beneficial effects. The higher molecular monoketene preferably is derived from tall oil fatty acids for efficiency and economy.

Other aspects of my invention comprise a fiber-treating composition and fibers treated therewith, preferably with about 0.01-1% of the composition on a fiber weight basis, which composition comprises a dispersion in inert liquid medium of my condensation copolymer reaction product.

As a still further aspect, my invention comprises a process for treating fibers, preferably cellulosic fibers, the process comprising applying to the fibers a dispersion in inert liquid medium of my condensation copolymer reaction product, the dispersion preferably containing about 0.01-1% of the reaction product on a fiber weight basis, and drying the impregnated fibers.

My ketenes of polymer acids are organic compounds having more than one ketene group per molecule and are derived from simple, i.e., two and three unit polymers of polyenoic monobasic acids having 12-44 carbon atoms. Preparation of these polymer acids is shown in U.S. Patents 2,646,399 and 2,718,503. Most suitably for efficiency and economy they are the so-called "dimer" acids, that is generally the dimers, trimers and mixtures of same of $C_{18}$ unsaturated fatty acids, usually rich in linoleic acid and predominating in the linoleic acid dimer. Especially useful polymer acids include those formed from linoleic, linolenic, palmitolic, humoceric, and eicosinic acids, and mixtures of same. Commercially the so-called dimer acids are available as mixtures containing about 3-25 parts of dimer acids per part of trimer acid; for efficiency and economy I prefer to use these readily-available mixtures for our polyketene preparation.

My higher molecular monoketenes are derived from acids having the formula R—CH$_2$—COOH where R is an alkyl group having at least 4 and preferably 6-22 carbon atoms, cycloalkyl having at least 6 carbon atoms, alkenyl, aryl, aralkyl, and alkaryl groups. Most suitably these acids are fatty acids having about 12-24 carbon atoms, e.g., myristic, oleic, linoleic, linolenic palmitic, stearic, arachidic, erucic, and behenic, hence I will refer to them generally as fatty acids for convenience herein. As these acids are often derived from natural products, they are available commercially as mixtures. I have found these mixtures to be quite suitable; they include those from tall oil, cocoanut oil, palm kernel oil, palm oil, olive oil, peanut oil, rape oil, cottonseed oil, soybean oil, and beef tallow. Preferably I form my higher molecular monoketenes by dehydrohalogenation of fatty acid chlorides derived from tall oil, a natural product yielding a fatty acid fraction low in saturated acids such as palmitic and generally containing a preponderant fraction, usually in about equal proportions, of oleic and linoleic acids.

I prepare my condensation copolymer reaction product by forming a mixture of acid halides of fatty acids and polymer acids in an inert reaction vehicle such as benzene and dehydrohalogenating the mixture at atmospheric pressure by refluxing or simply on standing at room temperature for an extended period while adding gradually a tertiary nitrogen base, such as the volatile triethylamine to form a filterable salt byproduct. Excess triethylamine and benzene in the filtrate are stripped from the dehydrohalogenated mixture by distillation, leaving the condensation copolymer reaction product. When highly viscous reaction products are encountered, filtration can be assisted by additional dilution of the reaction mixture with benzene or similar solvent.

I dehydrohalogenate an acid chloride mixture containing about 0.1 part to about 9 parts of the acid chlorides from polymer acids per part of the acid chlorides from fatty acids. Using less than about 0.1 part of the acid chlorides from polymer acids does not show functionality substantially different from ketenes prepared from fatty acids alone. On the other hand using greater than about 9 parts of polymer acid chlorides per part of fatty acid chlorides can be uneconomical and produces a reaction product of very high viscosity which is difficult to prepare and is refractory towards dispersion for useful application. For making paper sizes of highest acid resistance I prefer to use about 0.5-3 parts of the polymer acids per part of the higher molecular acids.

I established proof of formation of a ketene copolymer condensation product, as contrasted to a mere physical mixture of ketone polymers of polymer acids with ketene dimers of fatty acids by separately preparing fatty acid ketene dimers and the polyketene product from polymer acids. The ketene polymer prepared from polymer acids was a solid which, contrary to expectation, would not dissolve in liquid phase fatty acid ketene dimer, even on heating for four hours at a temperature of 80° C., or on standing at room temperature for two weeks. On the other hand my ketene copolymer condensation product prepared from a corresponding mixture of polymer acids and fatty acids is a homogeneous liquid at room temperature. Confirmation of these experimental results was accomplished by molecular weight determinations of the copolymer condensation product which gave molecular weights which were higher than for the separately prepared corresponding polymer products.

My condensation copolymer products can be dissolved or dispersed in liquid medium prior to use for fiber impregnation. Inert vehicle liquids that can be used include carbon disulfide, benzene, water, hexane and carbon tetrachloride. The copolymer can be a solute in or emulsified with the medium. In most sizing applications aqueous emulsions containing an emulsifying agent and/or thickening agent are suitable.

Useful thickening agents include starch and carboxymethyl cellulose. These can assist the emulsifying agent, which can be, for example, a synthetic detergent, such as dodecylbenzene sulfonate, various alkali metal soaps, polyoxyalkylene derivatives of sorbitan monopalmitate, polyoxyethylene sorbitan trioleate, and others such as those disclosed in U.S. Patent 2,627,477. Advantageously the mixture for emulsification is heated and stirred in conventional manner to provide for efficient formation and satisfactory stability.

Conventional fiber impregnation methods are useful for my reaction product. The degree of impregnation and consequent moisture, alkali, and acid resistance depends upon the fiber to be impregnated and the concentration of reaction product in the impregnating mixture. Typically, fabrics can be dipped in my dispersion, withdrawn, and dried, optionally with mechanical removal of excess dispersion by scraping or wringing before drying. The impregnated fibers are ordinarily subjected to drying operations by baking or heating, generally at a temperature above about 80° C., for a sufficient period to allow the fabric to be free from solvent and to allow the reaction product to become tenaciously adhering to the material.

My ketene copolymers can be desirably reacted with cellulose, as in the form of fibers for paper production, or as rayon, linen, etc. to form a chemically bonded protected fiber, the reaction of ketene with cellulosive substance being generally considered as a reaction of ketene with a polyhydric alcohol. Moreover, further groups, as amine, such as in wool fibers, can be reactive toward ketene to form chemically bound protected fiber, although I do not mean to preclude fiber encapsulation or similar physical protection phenomena.

In sizing of cellulosive fibers in paper production my product is preferably dispersed in aqueous media prior to application to the fibers, which can take place at any conventional step in the paper process, usually at a point ahead of the wire. Preferably the sizing dispersion is combined with an aqueous suspension of cellulosic fibers such as in the beater of the paper-making system and the resulting pulp is then formed into webs or sheets in conventional manner. Following drying of the paper web or sheet according to the usual procedures followed in the paper-making art, the sheet can be cured by either heating at a temperature of about 80–110° C. for a period of a few minutes or so, or by allowing the paper product to stand or be stored at ordinary room temperature for a period of about 24 hours or more.

The following example shows a way in which the invention has been practiced but should not be construed as limiting the invention. All parts and percentages are by weight unless otherwise specified.

In the example product A was a control composition made by dissolving a commercially available oleic acid ketene dimer (having a molecular weight of 532 and a freezing point of −22° C.) in benzene solvent to form a solution containing 0.0025 gram of ketene dimer per cc. of solution.

Product B was made by charging: (1) 30 grams of fatty acid chlorides derived from tall oil fatty acids having 98.8% fatty acids, 0.81% rosin acids and the rest unsaponifiables, an acid number of 198, and a specific gravity at 25° C. of 0.896; and (2) 10 grams of the acid chlorides from "dimer" acid which had acid number of about 188–193, a color on the Gardner scale of about 8, and contained about 95% $C_{36}$ dibasic acid having a molecular weight of about 585, and about 4% $C_{54}$ tribasic acid of molecular weight of about 845, the remainder being monobasic carboxylic acids; into a reaction flask containing 320 grams of benzene, then adding dropwise 16 grams of triethylamine over a period of 10 minutes and then refluxing the mixture for two hours. The mixture was cooled and the triethylamine hydrochloride precipitate filtered off, the filtrate containing a benzene solution of copolymer reaction product and unreacted triethylamine. This filtrate was charged to a stripping flask, stirred and warmed, and the benzene and triethylamine distilled off under subatmospheric pressure.

Product C was prepared in the same manner as Product B except 1 part of tall oil fatty acid chloride was used per part of "dimer" acid chlorides.

Product D was prepared in the same manner as Product B except that 1 part of tall oil fatty acid chlorides was used per 3 parts of "dimer" acid chlorides.

*Example*

A 2% pulp solution was prepared by beating unsized paper towelling and tap water for 15 minutes in a macerating machine. After cooling the pH was determined to be 8.5. Four 200 gram samples of this pulp solution were successively returned to the blender and a 2 cc. amount of benzene solution of ketene polymer product was added, Product A being added to the first sample, Product B to the second, and so on, so that the amount of the ketene product added in each case was 0.005 gram, or 0.12% on a basis of the dry pulp present. The resulting slurries were blended for one minute. Hand sheets were prepared by filtering the slurry through filter paper and separating the filter paper from the matted sheet, which subsequently was dried at 110° C. The resulting hand sheets were tested for resistance to water, alkali, and acid. All data are listed below.

| Description | Sizing tests adsorption time in seconds* | | |
|---|---|---|---|
| | Water | 0.2 N NaOH | 0.2 N HCl |
| A | 7,350 | 1,800 | 1,150 |
| B | 5,900 | 950 | 6,050 |
| C | 9,100 | 1,885 | 6,700 |
| D | 7,300 | 1,900 | 6,200 |

*Average of at least 3 determinations.

I claim:
1. A condensation copolymer reaction product of:
   (A) about 0.1–9 parts of a polyketene of a polyenoic carboxylic polymer acid, and
   (B) about one part of a higher molecular monoketene derived from acids having the formula R—$CH_2$—COOH wherein R is selected from the group consisting of alkenyl, aryl, aralkyl, alkaryl, alkyl having at least 4 carbon atoms, and cycloalkyl having at least 6 carbon atoms,
where said polyenoic carboxylic polymer acid is selected from the group consisting of dimers of polyenoicmonocarboxylic acids, trimers of polyenoicmonocarboxylic acids and mixtures thereof, said dimers, trimers, and their mixtures being formed from polyenoic monobasic acids having 12–44 carbon atoms.

2. The condensation copolymer of claim 1 wherein R of said higher molecular ketene has at least 4 carbon atoms and is selected from the group consisting of alkenyl and alkyl.

3. The condensation copolymer of claim 1, the reaction product of about 0.5–3 parts of said polyketene and one part of a higher molecular monoketene derived from tall oil fatty acids.

4. The condensation copolymer reaction product of claim 1 wherein said polyketene is a mixture derived from about 3–25 parts of said dimers per part of said trimers.

5. A process for treating fibers in the form of a web which comprises impregnating said web of fibers with a dispersion of about 0.1–1%, basis fiber weight, of a condensation copolymer reaction product of:
   (A) about 0.1–9 parts of a polyketene of a polyenoic carboxylic polymer acid, and
   (B) about one part of a higher molecular monoketene derived from acids having the formula R—CH$_2$—COOH wherein R is selected from the group consisting of alkenyl, aryl, aralkyl, alkaryl, alkyl having at least 4 carbon atoms, and cycloalkyl having at least 6 carbon atoms,
where said polyenoic carboxylic polymer acid is selected from the group consisting of dimers of polyenoicmonocarboxylic acids, trimers of polyenoicmonocarboxylic acids and mixtures thereof, said dimers, trimers, and their mixtures being formed from polyenoic monobasic acids having 12–44 carbon atoms, and drying said impregnated web of fibers.

6. The process of claim 5 wherein said fibers are cellulosic fibers.

7. A web of fibers treated with about 0.01–1% basis fiber weight, of a dispersion of a condensation copolymer reaction product of:
(A) about 0.1–9 parts of a polyketene of a polyenoic carboxylic polymer acid, and
(B) about one part of a higher molecular monoketene derived from acids having the formula R—CH$_2$—COOH wherein R is selected from the group consisting of alkenyl, aryl, aralkyl, alkaryl, alkyl having at least 4 carbon atoms, and cycloalkyl having at least 6 carbon atoms,
wherein said polyenoic carboxylic polymer acid is selected from the group consisting of dimers of polyenoicmonocarboxylic acids, trimers of polyenoicmonocarboxylic acids and mixtures thereof, said dimers, trimers, and their mixtures being formed from polyenoic monobasic acids having 12–44 carbon atoms.

8. A fiber-treating composition comprising a dispersion in inert liquid medium of condensation copolymer reaction product of:
(A) about 0.1–9 parts of a polyketene of a polyenoic carboxylic polymer acid, and
(B) about one part of a higher molecular monoketene derived from acids having the formula R—CH$_2$—COOH wherein R is selected from the group consisting of alkenyl, aryl, aralkyl, alkaryl, alkyl having at least 4 carbon atoms, and cycloalkyl having at least 6 carbon atoms,
where said polyenoic carboxylic polymer acid is selected from the group consisting of dimers of polyenoicmonocarboxylic acids, trimers of polyenoicmonocarboxylic acids and mixtures thereof, said dimers, trimers and their mixtures being formed from polyenoic monobasic acids having 12–44 carbon atoms, said inert liquid medium being at least one selected from the group consisting of carbon disulfide, benzene, water, hexane and carbon tetrachloride.

References Cited by the Examiner

UNITED STATES PATENTS

| | | | |
|---|---|---|---|
| 2,627,477 | 2/1953 | Downey | 162—158 |
| 2,675,392 | 4/1954 | Theobald. | |
| 2,762,270 | 9/1956 | Keim | 162—158 |
| 3,002,024 | 9/1961 | Blomquist | 260—63 |

DONALL H. SYLVESTER, *Primary Examiner.*

MORRIS O. WOLK, *Examiner.*